United States Patent
Knurek et al.

[11] Patent Number: 6,129,328
[45] Date of Patent: Oct. 10, 2000

[54] HEAT RESISTANT ENGINE MOUNT

[75] Inventors: Thomas A. Knurek, Findlay, Ohio; Donald S. Novotny, Fort Wayne; Lanre S. Ogundipe, South Bend, both of Ind.

[73] Assignee: Cooper Tire & Rubber Company, Findlay, Ohio

[21] Appl. No.: 09/159,928

[22] Filed: Sep. 24, 1998

[51] Int. Cl.[7] ............................. F16M 1/00; F16M 13/00
[52] U.S. Cl. ........................ 248/638; 248/560; 248/603
[58] Field of Search ............................ 248/560, 562, 248/603, 604, 605, 608, 609, 610, 611, 613, 614, 634, 636, 638; 267/141, 141.1, 141.2, 141.3, 141.4, 292, 293, 294, 140.11, 140.12, 140.13

[56] References Cited

U.S. PATENT DOCUMENTS

| 4,806,437 | 2/1989 | Yokoi et al. | 428/623 |
| 5,031,873 | 7/1991 | Rau | 248/632 |
| 5,121,904 | 6/1992 | Freudenberg | 267/140.13 |
| 5,284,315 | 2/1994 | Hofmann et al. | 246/562 |
| 5,551,661 | 9/1996 | Bunker | 248/634 |
| 5,641,153 | 6/1997 | Gwinn | 267/294 |
| 5,762,313 | 6/1998 | Siemer | 248/635 |

*Primary Examiner*—Ramon O. Ramirez
*Assistant Examiner*—David Heisey
*Attorney, Agent, or Firm*—Joseph G. Nauman

[57] ABSTRACT

A vibration isolator assembly, such as a vehicle drive train mount, incorporates a heat shield which protects the elastomeric parts of the isolator assembly from high temperature radiation which could degrade the elastomeric parts.

3 Claims, 4 Drawing Sheets

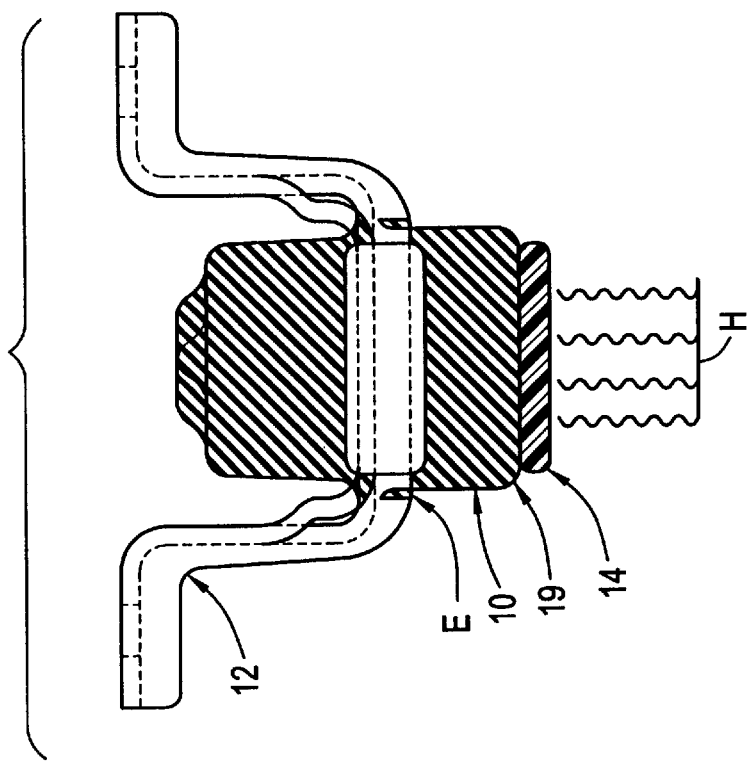
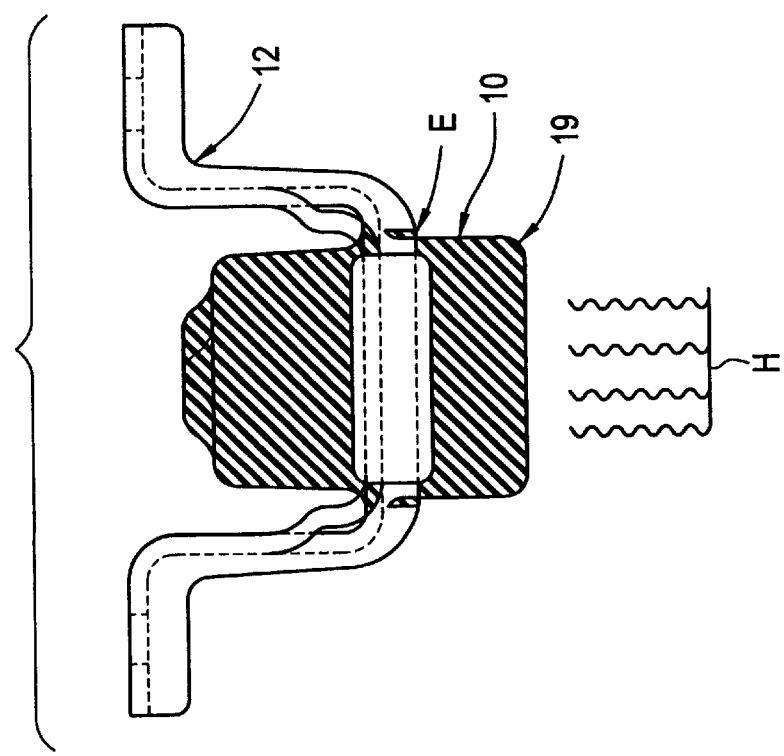

HEAT RESISTANT ENGINE MOUNT

FIELD OF THE INVENTION

The invention relates to mounts for vehicle engines and/or transaxles, and to degradation of the elastomeric parts of such mounts due to heat in the compartments where such mounts are installed, e.g. to support an engine on chassis structure.

BACKGROUND OF THE INVENTION

Heat induced failure of engine mounts is a problem experienced by vehicle manufactures for example due to certain vehicle designs which result in reduced air flow cooling of the engine compartment. Supplier of such mounts have been requested to submit concepts that primarily consist of using high temperature resistant polymers in the mount structure. However investigations have not revealed a substitute for the fatigue resistance of natural rubber.

As a solution, the invention disclosed herein combines materials within a mount design which utilizes the advantages of each material by separating the functions and contributions of the materials. A specially formulated natural rubber based material is used for the primary shock isolating (spring) element, while plastic is used as a non-conductible insulator, and a rubber cap or shroud is used for a convection and radiation heat path reducer Savard U.S. Pat. No. 2,655,090 broadly discloses a thermal shroud for an engine mount, but does not show the relationship of the shroud to any mount structure. Law U.S. Pat. No. 5,1112,144 provides an elastomeric bearing structure which provides for thermal expansion and contraction. A central load member moves within rubber blocks and laminated with shaped metal plates which allow for thermal changes. These two patents reference problems with temperature, while Most of the remaining prior art is concerned with reducing wear and tear per se.

Wieme U.S. Pat. No. 4,278,726 discloses an energy absorbing element comprising a laminate of reinforced plastic bonded to vulcanized elastomer, namely a plastic core is laminated with two rubber layers.

Stimeling U.S. Pat. No. 4,744,539, Barrett U.S. Pat. No. 5,087,491, Fukahori et al U.S. Pat. No. 4,978,581 and Fukahori et al U.S. Pat. No. 4,830,927 disclose cushioning members having a laminated structure. In Stimeling, the laminate comprises elastomer layers bonded to metal layers. The Fukahori et al documents both show rigid metal layers bonded to viscoelastic flexible plates. Barrett broadly shows a laminate of stiff layers formed with viscoelastic layers.

The Fischer U.S. Pat. No. 4,887,788 discloses an energy absorbing pad comprising an elastomeric resilient element combined with elements of greater stiffness; column 4, lines 314.

SUMMARY OF THE INVENTION

Based upon a study and measure of the heat transfer through an elastomeric power train vibration isolator assembly, within the possible vehicle operating temperature range, with and without a heat shield, and upon the effect of incorporating a heat shield in heat transfer on the molded isolator assembly, the transfer function and natural frequency of the elastomeric power train vibration isolator assembly, with and without a heat shield, has been determined. As a result a novel vibration isolator assembly (mounts) has been designed incorporating a heat shield to protect the elastomeric parts, from heat damage by interrupting radiation in the infrared (IR) band to reduce the exposure of the elastomeric parts to such radiation; as is illustrated and described, including its effect on the transfer function and natural frequency of the molded isolator assembly.

BRIEF DESCRIPTION OF THE DRAWINGS

FIG. 1 is a cross-sectional view of a reference structure for testing of heat shield effect on heat radiated to a mount;

FIG. 2 a cross-sectional view of a comparable study structure with an included heat shield;

DESCRIPTION OF THE PREFERRED EMBODIMENT

The specimens shown in FIG. 1 and FIG. 2 represent a typical molded isolator engine mount assembly. FIG. 1 illustrates the control specimen without a heat shield and FIG. 2 illustrates a study mount with a heat shield of ultra-high molecular weight polymer. In each specimen, an elastomeric block 10 is molded to a metal bracket 12. The heat shield 14 is attached to the block in FIG. 2.

The test specimens were exposed to a constant heat source H, and five temperature measurement points were used, point A being the "Beginning Temperature Measurement Point" and point E being the "Ending Temperature Measurement Point". Point E is at the interface between the elastomer and metal component of the study mount specimen (FIG. 2).

Heat transfer measurements of both the reference and study structures were made at two separate heat source temperatures, 300 degrees F and 400 degrees F respectively, every ten minutes of heat exposure for a period of one hundred and twenty minutes.

The reference and study structures were rigidly attached to a shaker at the flanged portion of brackets 12, corresponding to the engine side of a mount, one structure at a time. Two accelerometers were rigidly attached, one close to the center of point E surface, and the other at the center of point A surface. The shaker was driven with a 10-volt random (white noise) signal from an FFT, and the transfer function (H21) spectrum was processed from 0 to 20 KHZ, with 0 to 2.5 KHz saved.

Each of the reference and study structures was hung freely with a loop of wire through one hole on the flanged portion (corresponding to the engine side of a mount), one specimen at a time. Two accelerometers were rigidly attached, one on the flange opposite the hung flange, and on opposite surface to the surface to be excited, and the other at the center of point A surface. Each structure was excited by striking the free end of the assembly with a modular hammer. The spectrum S1 (center), & S2 (edge) were processed from 0 to 20 KHz, with 0 to 1.25 KHz saved.

Figure 3:
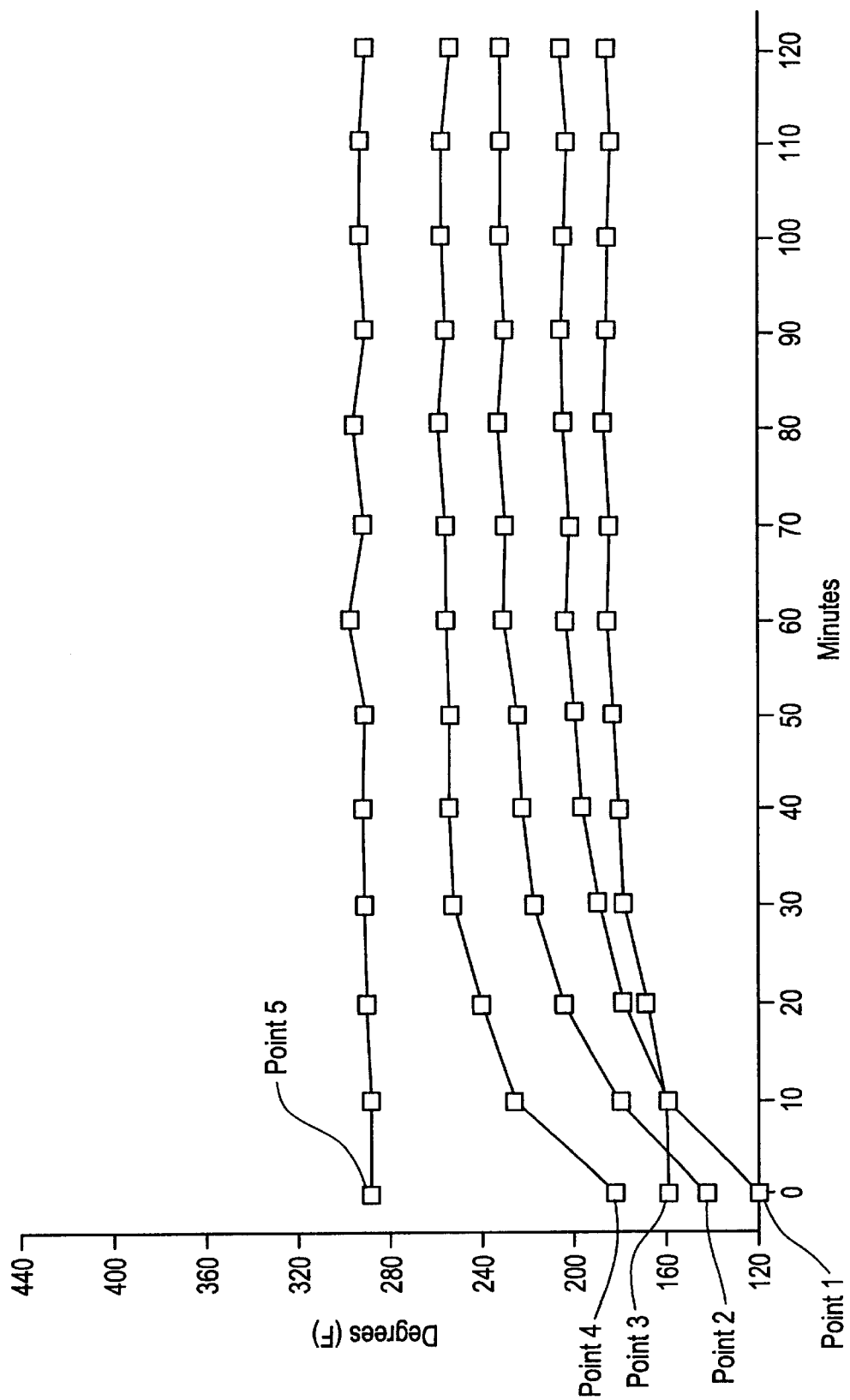
FIG. 3 is a graph developed from a heat transfer study at 300 degrees F.
Figure 4:
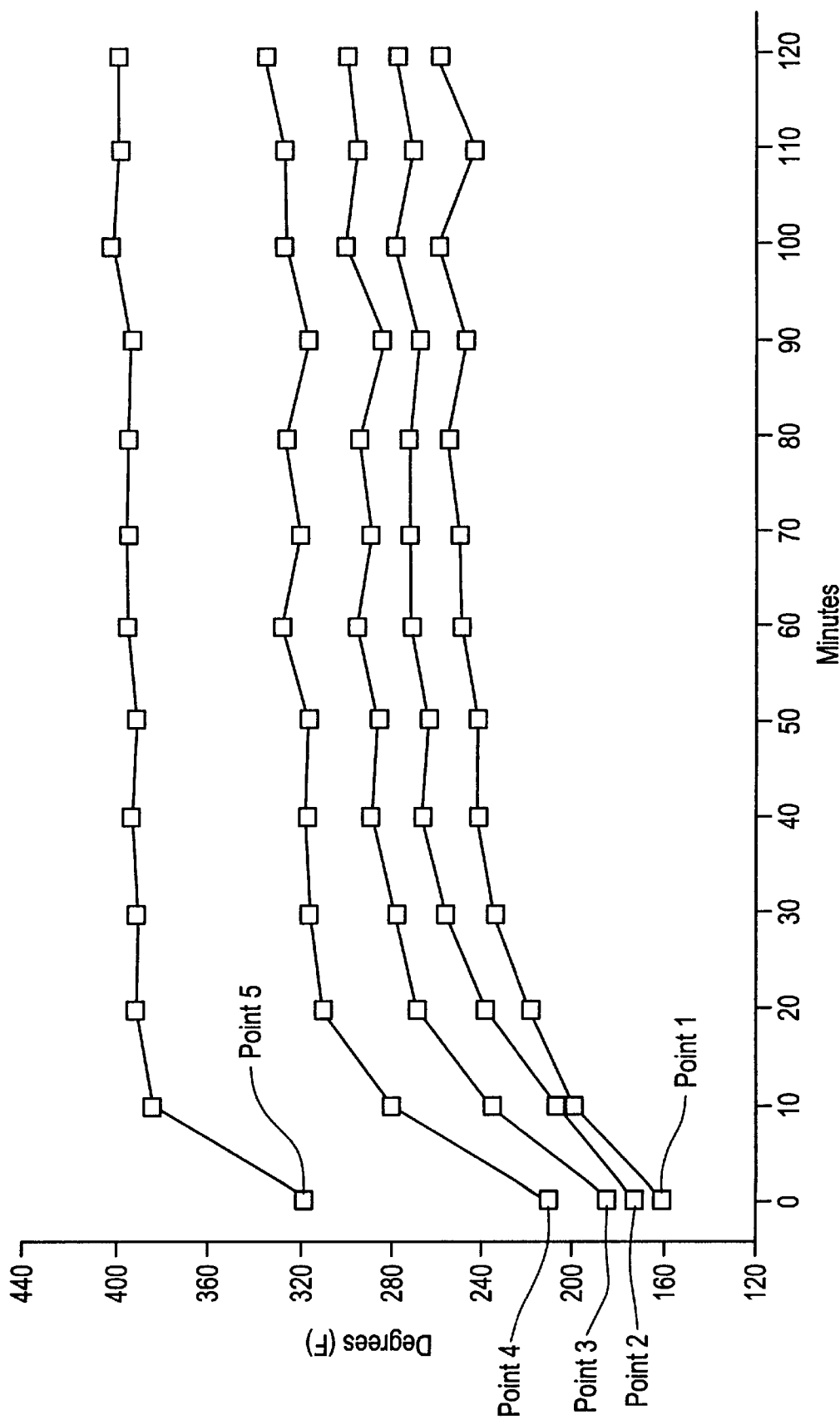
FIG. 4 is a graph developed from a heat transfer study at 400 degrees F.

At 300 degree F constant heat exposure, FIG. 3 shows the plots of the heat transfer pattern, on the reference specimen compared to the study specimen, at the five measurement points. At 400 degrees F constant heat exposure, FIG. 4 shows the plot of the heat transfer pattern, on the control specimen compared to the study specimen at the five measurement points.

Figure 5:
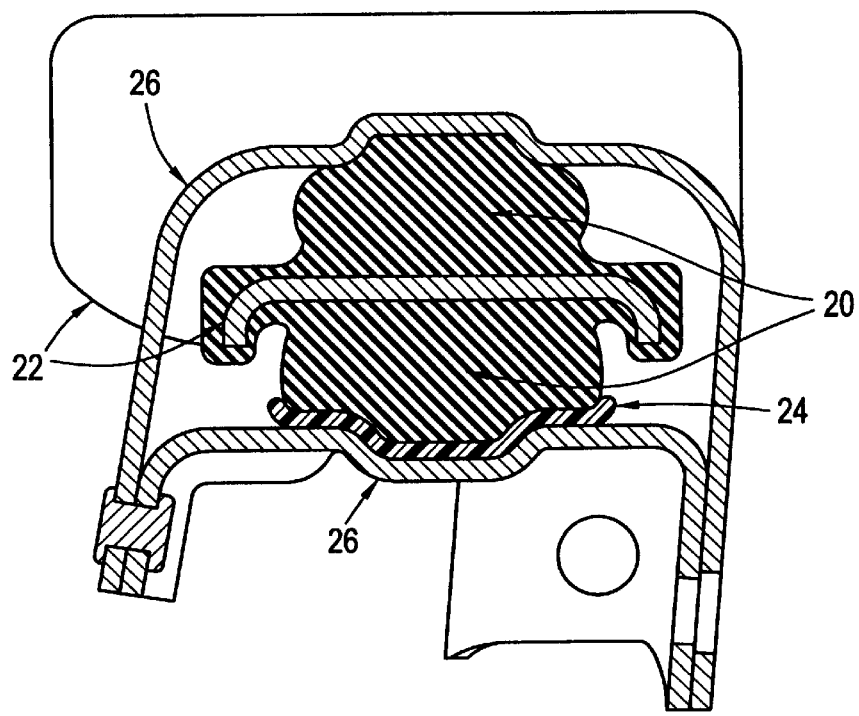
FIG. 5 is a frontal cross-sectional view of a mount incorporating the invention.
Figure 6:
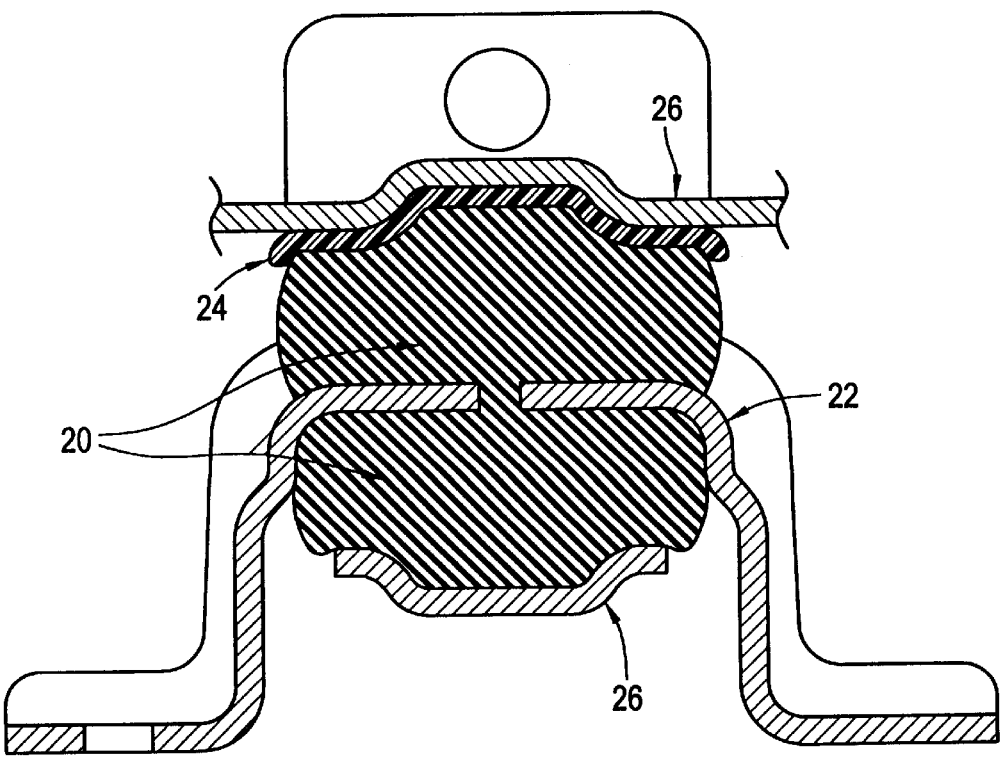
FIG. 6 is a cross-sectional view from the side of the mount shown in FIG. 5.

FIGS. 5 and 6, which are inverted with respect to each other, illustrate a typical form of mount embodying the invention. The elastomeric block 20 is molded around an upper or first bracket member 22, and the heat shield 24 formed of ultra-high molecular weight polymer is applied to block 20 at the appropriate location to intercept radiation in the IR band from a source toward the elastomeric block 20 of the mount. The other lower or second bracket 26 is placed around the elastomeric block 20 and heat shield 24. In a typical environment bracket 22 might be attached to an engine block or transmission, and bracket 26 might be attached to a chassis or body component of a vehicle.

While the form of apparatus herein described constitutes a preferred form of this invention, it is to be understood that the invention is not limited to this precise form of apparatus, and that changes may be made therein without departing from the scope of the invention which is defined in the appended claims.

What is claimed is:

1. A vibration absorbing mount for supporting a component having substantial mass in a vehicle, comprising a first bracket adapted for attachment to the component, a second bracket adapted for attachment to the vehicle, a heat degradable elastomeric element attached to and between said brackets, a heat shield member capable of intercepting heat radiation in the IR band and surrounding said elastomeric element as least in part, and said heat shield member being positioned on said elastomeric element so as to intercept heat radiation in the IR band from a beat source in said vehicle proximate to the mount, so as to reduce substantially the exposure of said elastomeric element to such radiation.

2. A vibration absorbing mount as defined in claim 1, wherein said heat shield member is formed of an ultra high molecular weight polymer.

3. A vibration absorbing mount as defined in claim 2, wherein said heat shield member is formed as a layer conformed to and at least partially covering said elastomeric element.

* * * * *